United States Patent Office 3,291,250
Patented Dec. 13, 1966

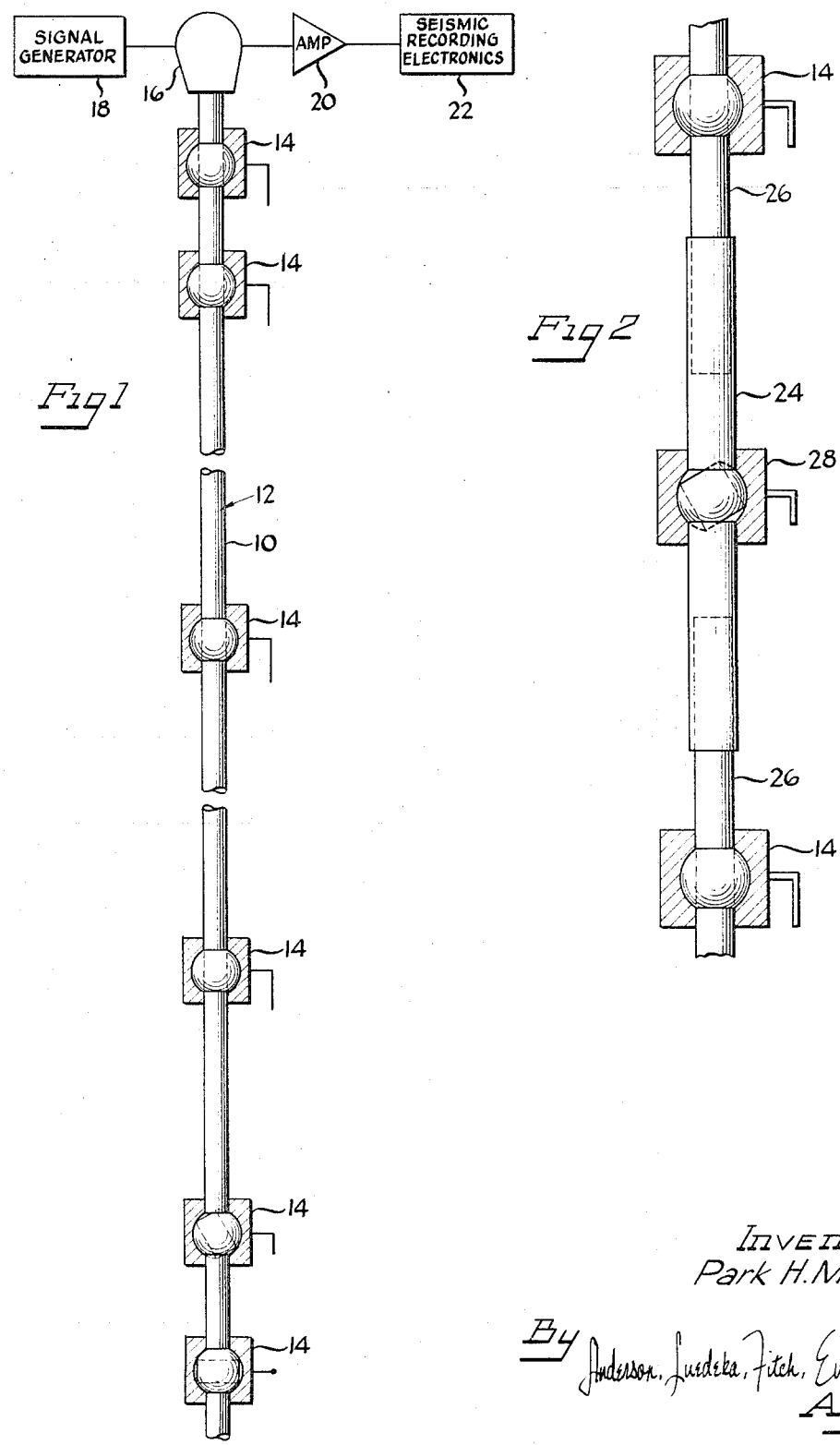

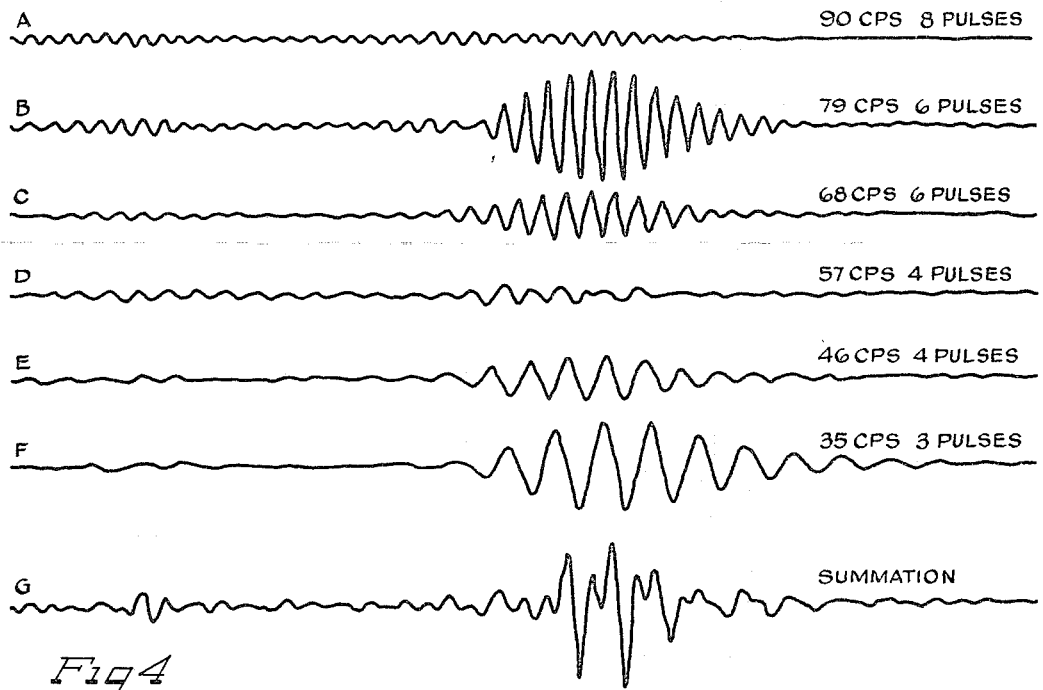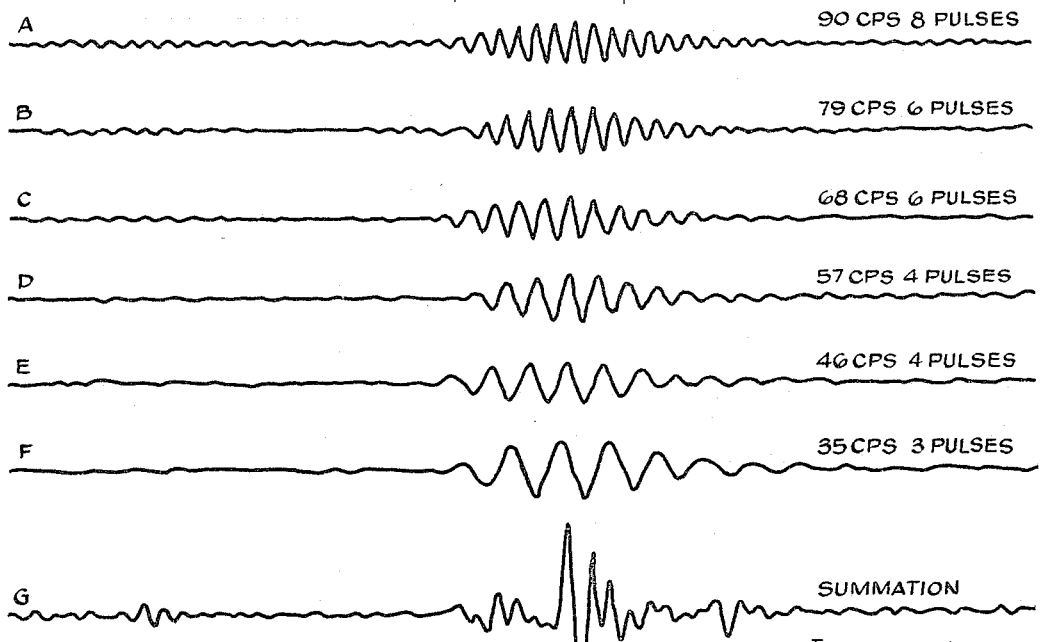

3,291,250
ANALOGUE DEVICE FOR GEOPHYSICAL PROSPECTING
Park H. Miller, Jr., Del Mar, Calif., assignor to General Dynamics Corporation, New York, N.Y., a corporation of Delaware
Filed July 13, 1964, Ser. No. 382,085
5 Claims. (Cl. 181—.5)

This invention relates to analogues for seismic reflectors and more particularly to means for generating artificial seismograms.

The general principles of seismic surveying are relatively well-known. This technique of geophysical prospecting is employed to determine the subsurface structure of the earth, such as the geometry of various strata having different acoustic properties. This information is used as a guide for the location of natural resource deposits, such as ore deposits, petroleum deposits, etc. Seismic surveying involves the transmission of vibratory energy, e.g., acoustic or sound waves, through the earth and the reception, recording and interpretation of such waves returning to the earth's surface after reflection from or refraction along boundaries between geological layers.

In geophysical prospecting, background noise from various external sources such as highway traffic, airplanes, earth moving, drilling, or moving air, often makes it difficult to distinguish useful signals, whether reflected or refracted, from noise. Even when it is possible to extract the waveform from the noise, variations in the earth's surface and other interference often make evaluation of the reflected or refracted seismic wave difficult.

It is desirable in the analysis of such waveforms, therefore, to have means to help recognize and analyze the received seismic signals. One way of facilitating such analysis is to provide a device for generating artificial seismic waves. Such a device is designed to generate waveforms that show what actual waveforms will look like when one or more reflecting layers exist in the earth under certain conditions. The device is an analogue of the reflecting strata and can be made to represent various conditions of the strata.

The waveform produced by the seismic detector or geophone is recorded to produce a seismogram. The recorded wave form for a particular reflecting stratum is called its "signature," and a particular "signature" is indicative of a particular set of conditions. Since the device of the present invention is used to simulate particular sets of conditions, it is called a "signature generator." The analogue device, of course, does not generate the signature by itself, but when used with the seismic prospecting system, particularly the seismic recording apparatus, signatures are produced that represent typical earth conditions. By setting up the device in various ways, signatures typical of many different conditions may be generated. These typical signatures may then be compared with those obtained in the field to help identify the conditions of the actual reflecting strata in the earth.

It is thus an object of this invention to provide an improved apparatus for generating artificial seismic waveforms. It is another object of this invention to provide a signature generator adaptable for generating differing artificial seismic waveforms. It is still another object to provide a signature generator which is versatile and relatively simple to operate.

These and other objects of the present invention will become apparent by reference to the following description and accompanying drawings wherein:

FIGURE 1 is a diagrammatic view of one embodiment of the signature generator of the present invention;

FIGURE 2 is a modification of the embodiment of FIGURE 1;

FIGURE 3 is a illustration of the reflection signals developed by the apparatus shown in FIGURE 1; and FIGURE 4 is an illustration of the reflection signals developed by the apparatus shown in FIGURE 1 under modified conditions.

In general, the signature generator includes a cylindrical body 10 enclosing a quantity of gas 12 suitable for transmission of sound at a relatively slow speed allowing simulation of the speed of sound in earth with a device of manageable length. Acoustical waves, transmitted through the gas strike selectively created discontinuities 14 introduced into the gas to simulate the reflective surfaces of the earth. Such discontinuities cause reflection of at least a portion of the transmitted acoustical waves. The reflected waves are sensed and converted to an electrical waveform. This waveform is recorded to produce a signature substantially identical to seismic waveforms recorded in field operations.

Referring more specifically to the drawings, in one embodiment of the signature generator as shown in FIGURE 1, there is provided a cylindrical line 10 of copper tubing having an outer diameter of 5/8" and a wall thickness of 1/32". The line 10 is evacuated and filled with a Freon compound, 1,2-dichlorotetrafluorethane 12 in which the velocity of sound is about 400 ft./sec. at room temperature. The velocity of sound through the earth is typically about 8000 ft./sec., so one foot of this gas is analogous to 20 feet of rock. Thus, a reflector at the end of a 150 foot signature generator is representative of a reflecting stratum at 3000 feet, for sound travelling in the column of gas in the signature generator will be reflected and reach the acoustic receiver after the same time interval as sound travelling through 20 times as much rock. Thus the relatively slow speed of sound in the Freon gas permits the use of a useful signature generator of a length that can be conveniently used while at the same time representing the relatively very large distances typical of the depths of the reflecting strata of interest.

At the same time, the tubing is made of material having a much higher acoustic velocity than said gas so that any acoustic waves travelling in the tubing itself are received long before the reflections through the gas and are thus easily distinguished therefrom on the basis of time.

The diameter of the tubing 10 is chosen to provide attenuation of approximately 60% over a distance of 150 feet for operating frequencies in the region of interest.

A suitable transducer 16 affixed to one end of the cylindrical line 10 responds to electrical energy provided by a signal generator 18 to generate acoustical waves in the gas along the length of the line 10. The transducer 16 may be a conventional loud speaker driver unit. The signal generator 18 may be of any standard type which causes the transducer 16 to provide acoustic waves similar to those generated in the earth in actual seismic exploration. Thus, the signal generator 18 may cause the transducer 16 to provide monochromatic acoustical waves used for study of interference effects, or it may be of the type disclosed in the copending application of Dwight C. Pound, Serial No. 382,303 filed July 13, 1964 for Control Apparatus for Seismic Sources and assigned to the same assignee, which causes a series of pulses of acoustical waves of different frequencies to be generated.

A plurality of valves 14 are positioned at various locations along the line 10. These valves 14 are of a type, such as a plug valve, that when open, present substantially no discontinuity in the structure of the tubing and, therefore, create negligible acoustic mismatch as would cause a reflection. The valves 14, when at least partially closed, simulate a reflecting layer in the earth by causing at least a portion of the acoustical wave traveling in the gas to be reflected. The valves 14 may be closed varying amounts to produce any desired degree of reflection.

The reflected acoustical waves are sensed by a receiving transducer which conveniently may be the same transducer 16 as that originally generating the sonic wave. The transducer 16 converts the acoustic energy to an electrical signal which is amplified by any amplifier 20 of standard construction and recorded by a suitable recording device 22 which may also be of any suitable construction. For example, when the multiple frequency sound waves are generated, the amplifying and recording circuitry may take the form described in full in the copending application of Park H. Miller, Jr., Dwight C. Pound and Herschel R. Snodgrass, Serial No. 382,086, filed July 13, 1964 for Geophysical Propecting and describing operation in a summation mode.

One modification of the signature generator is shown in FIGURE 2. This embodiment provides for continuous variation in valve separation, thus allowing study of reflected waveforms as separation between two reflectors is gradually changed. Continuous variation is provided by a sliding trombone-like section of tubing 24 having an inner diameter of %6". This section is slidably mounted at both ends on lengths of tubing 26 having %6" outer diameter. Each of the sections 26 is connected to a valve 14 which is part of the remaining portion of the acoustic line 10. An additional valve 28 is located in the slidable section 24. This structure allows for continuous variation of valve spacing over a limited range.

Thus, there has been provided an improved acoustical signature generator which is adaptable for generating acoustic waveforms that simulate seismic signals. The described signature generator is simple to operate and versatile since reflecting or interfering surfaces can be readily introduced or eliminated. In addition, the described signature generator is easily usable in field operations since the electronic components may be the same as used for actual seismic surveying. This is because the velocity is scaled down to correspond to the scaled down size of the analogue device, thereby preserving the time and frequency relationships of the reflecting strata being simulated. Because the time and frequency relationships are not scaled, the device can be used as a test device with the field apparatus to determine whether or not the field apparatus is in proper working order. It is also useful in calibrating and adjusting the field apparatus.

In FIGURE 3 is shown the results obtained utilizing the signature generator of the present invention together with the geophysical prospecting system of the aforesaid copending application of Miller, Pound and Snodgrass. The sginature generator utilized the apparatus as shown in FIGURE 3 with valves at 2 feet, 5 feet, 95 feet, 130 feet, 145 feet and 150 feet, respectively, from the transducer 16. The records shown in FIGURE 3 were made with the valve at 145 feet closed and the other valves open. Pulse trains at the following frequencies were applied by the transducer 16:

(A) 90 cycles per second—8 pulses
(B) 79 cycles per second—6 pulses
(C) 68 cycles per second—6 pulses
(D) 57 cycles per second—4 pulses
(E) 46 cycles per second—4 pulses
(F) 35 cycles per second—3 pulses The detected reflected signals as recorded by the recording apparatus 22 are shown in FIGURE 3 as curves A, B, C, D, E and F, respectively. With these signals combined as described in the aforesaid application of Miller, Pound and Snodgrass, the summed signal produced was in the form shown in curve G of FIGURE 3.

With the valve at 145 feet partially closed and the valve at 150 feet completely closed, this same series of pulse trains produced corresponding detection signals shown in FIGURE 4 as curves A, B, C, D, E and F, respectively. Curve G of FIGURE 4 shows the summation record. This curve G shows the type of signature created by closely spaced reflectors producing an interference pattern.

Various other changes and modifications may be made in the above-described acoustic signature generator without deviating from the spirit and scope of the present invention.

Various modifications of the features of the invention are set forth in the following claims.

What is claimed is:

1. A seismic signature generator comprising a long hollow cylindrical body, gas confined within said body, means responsive to an electrical signal for producing continuous waves in said gas at one end of said body, a plurality of selectively operable means for producing acoustic discontinuities in said gas at respective selected points along said body, thereby causing reflection of said acoustic waves, and means responsive to said reflected acoustic waves returning to said one end of said body for producing a simulated seismic waveform, the velocity of sound in said gas and the distances of said selected points from said one end being such that the times of reflection of said acoustic waves in said gas are of the same order as the times of reflection of seismic waves from the reflecting strata being simulated.

2. A seismic signature generator comprising a long hollow cylindrical body, gas confined within said body, the velocity of sound in said gas being very slow relative to the velocity of sound in the earth, transducer means attached to one end of said body and responsive to an electrical signal for producing acoustic waves in said gas, a plurality of selectively operable means for producing acoustic discontinuities in said gas at respective selected points along said body, thereby causing reflection of said acoustic waves, and means responsive to said reflected waves returning to said one end of said body for producing a selected simulated seismic waveform, the distances of said selected points from said one end being such that the times of reflection of said acoustic waves in said gas are of the same order as the times of reflection of seismic waves from the reflecting strata being simulated.

3. A seismic signature generator comprising a tube, gas confined within said tube, the velocity of sound in said gas being very slow relative to the velocity of sound in the earth and in said tube, transducer means disposed at one end of said tube and responsive to an electrical signal for producing acoustic waves in said gas, a plurality of selectively operable valves disposed at respective selected points along said tube for causing, when operated, reflection of said acoustic waves, and means responsive to said reflected acoustic waves returning to said one end of said tube for producing a simulated seismic signature, the distances of said selected points from said one end being such that the times of reflection of said acoustic waves in said gas are of the same order as the times of reflection of seismic waves from the reflecting strata being simulated.

4. A seismic signature generator comprising a tube, gas confined within said tube, the velocity of sound in said gas being very slow relative to the velocity of sound in the earth and in said tube, transducer means disposed at one end of said tube and responsive to an electrical signal for producing acoustic waves in said gas, a plurality of selectively operable means for producing acoustic discontinuities in said gas at respective selected points along said body, thereby causing reflection of said acoustic waves, the position of at least one of said selectively operable means continuously adjustable along at least a portion of the length of said tube, and means responsive to said reflected waves returning to said one end of said body for producing a selected simulated seismic waveform.

5. A seismic signature generator comprising a tube, gas confined within said tube, the velocity of sound in said gas being very slow relative to the velocity of sound in the earth and in said tube, transducer means disposed at one end of said tube and responsive to an electrical signal for producing acoustic waves in said gas, a plurality of selectively operable valves disposed at respective selected points along said tube for causing reflection of said acoustic waves when operated, at least one of said valves being slidably mounted on said tube for continuous adjustment of the position thereof along at least a portion of said tube, and means responsive to said reflected acoustic waves returning to said one end of said tube for producing a simulated seismic signature.

References Cited by the Examiner

UNITED STATES PATENTS 2,834,422 5/1958 Angona _____ 181—.5
3,009,527 11/1961 Berryman et al. _____ 181—.5

SAMUEL FEINBERG, *Primary Examiner.*

BENJAMIN A. BORCHELT, *Examiner.*

M. F. HUBLER, *Assistant Examiner.*